United States Patent [19]

Bramow et al.

[11] 4,199,101
[45] Apr. 22, 1980

[54] MULTIPLE LOAD INTEGRATED FLUID CONTROL UNITS

[75] Inventors: Scott B. Bramow, Oak Creek; Richard N. Laakaniemi, Hales Corners; Paul E. Wichman, Brookfield, all of Wis.

[73] Assignee: Johnson Controls, Inc., Milwaukee, Wis.

[21] Appl. No.: 6,865

[22] Filed: Jan. 26, 1979

[51] Int. Cl.$^2$ .............................................. G05D 23/13
[52] U.S. Cl. ........................................ 236/13; 165/16; 236/49
[58] Field of Search .................... 236/13, 49, 91 R; 165/16

[56] References Cited

U.S. PATENT DOCUMENTS

| | | | |
|---|---|---|---|
| 2,234,633 | 3/1941 | Hoppe | 236/91 R X |
| 2,257,462 | 9/1941 | Gildersleeve et al. | 165/16 |
| 2,290,096 | 7/1942 | Dale et al. | 236/49 |
| 2,594,477 | 4/1952 | Miner et al. | 236/91 F X |
| 3,193,000 | 7/1965 | Bressoud | 236/91 R X |
| 3,967,780 | 7/1976 | Traver | 236/49 |
| 4,044,947 | 8/1977 | Spethmann | 236/13 |

Primary Examiner—William E. Wayner
Assistant Examiner—William E. Tapolcai, Jr.
Attorney, Agent, or Firm—Andrus, Sceales, Starke & Sawall

[57] ABSTRACT

A mixed air conditioning controller is formed as a factory assembled and adjusted unit in a compact housing, with simple and direct input/output field connectors. Various temperature and humidity input devices are field connected to produce a sequenced control of the air dampers and mechanical cooling and heating devices, as well as auxiliary devices. The controller includes a primary input related to room demand, an outside air temperature input, with an interlocked control to the damper, a fan status input, a minimum air supply control and a by-pass switch having a low limit input. The logic network connecting the input/output includes pneumatic switching, pressure selecting and comparing devices of a diaphragm-controlled-orifice construction connected to function as fluidic repeaters, pressure regulating valves and pressure isolating and switching devices. The controller includes a conditioning channel and a damper channel. An outside air interlock controls the damper channel and a presettable switch controls the minimum air supply control. The presettable switch also includes a low limit temperature signal input. An auxiliary output may drive a humidity controller having a conditioning channel and a humidity channel. The humidity controller includes an interlock network connected to transfer the humidity input signal to the conditioning channel and a switch means controlled by the auxiliary output of the temperature controller.

19 Claims, 5 Drawing Figures

MULTIPLE LOAD INTEGRATED FLUID CONTROL UNITS

BACKGROUND OF THE INVENTION

The present invention relates to a mixer and supply control for mixed fluid systems and particular to an air mixer and supply control for a mixed air conditioning system for controlling the conditioned air supplied to a building or the like.

In the environmental conditioning of enclosed spaces such as room or other area of a building structure, outside air is advantageously selectively mixed with recirculated room air to provide proper ventilation, desired air temperature and/or humidity within the room and minimized loading of the mechanical conditioning apparatus. Various controls systems have been suggested for monitoring the various parameters and providing appropriate combination of the outdoor air and return air. Generally, the control system is designed for particular applications and a significant number of different models are required for the many variations encountered. Each control system has generally been formed by selection of standard control components which are then field connected and programmed to adapt the system to a particular mixed air system configuration, as well as to the various system options. The system adaptation and field engineering requires special skilled personnel as well as being relatively expensive and time consuming. Further, the quality and repeatability of system installation is not adapted to a high degree of control. Although such modular units have been designed which permit factory assembly and control of the systems and the proper generation of multiple logic outputs, significant field work is required and a plurality of models have been provided. There is a need for a simple basic unit which can be directly applied to various mix air installations in a simple direct manner with a minimum amount of engineering skill, ability and knowhow.

SUMMARY OF THE PRESENT INVENTION

The present invention is particularly directed to a mixing control apparatus for conditioning systems particularly mixed air conditioning systems for controlling the temperature and/or humidity of environmental room air and the like which includes a plurality of inputs and outputs, with internal pneumatic or fluid responsive devices for interrelating the inputs and outputs and controlling the air flow control units and associated mechanical conditioning devices in the many various and different configured systems required in the field. Thus, a controller can be formed as a factory assembled and adjusted unit in a compact package, with simple and direct input/output field connection. The controller can therefore be readily understood and applied by the ordinary skilled technician in the field. Generally, in accordance with the present invention, a fluid amplifying, comparing and switching system is provided to continuously monitor and interconnect the basic input signals in accordance with various cooling demand, outside air temperature, mechanical apparatus status and the like, with the input signals connected to appropriate internal logic elements which generate mechanical device output control signals for operating of the mechanical devices. The basic controller includes, in addition to supply air input, a primary input related to room conditioning demand, an outside air temperature input, a fan status input, a low limit to override a minimum outside air control. The controller provides outputs for directly controlling of the various damper actuators, the mechanical equipment such as the cooling and heating devices and control valves as well as providing an auxiliary control output for special applications and a selective low limit damper control. The auxiliary output is preferably a binary output for controlling of associated equipment such as an interlock to a humidity control unit which may be interposed between the basic controller and the cooling control output. Thus, a basic humidity control unit may be constructed employing similar pneumatic logic elements to control the cooling equipment and the humidity supply control unit from the basic controller.

The temperature controller further includes internal adjustments which permit minimum percentage of outside air during cooling cycles, automatic switch-over means responsive to outside air temperature for selective lock-out of the outside air control, as well as system component status interlocks.

In a particularly practical and preferred construction, the logic switching system includes a plurality of pneumatic switching and comparing devices of a diaphragm-controlled-orifice construction. Thus, each of the logic and switching components generally includes a diaphragm defining a pair of opposing chambers, one of which constitutes a signal input chamber and the opposite of which constitutes a controlled air flow chamber having an orifice which is selectively opened and closed by the diaphragm and an input/output port for receiving or supplying a controlled air flow. Generally, the system includes a series of the fluid diaphragm logic units connected to function as fluidic repeaters, pressure regulating valves and pressure isolating and switching devices. The logic units are commercially available units and can be readily provided and interconnected with appropriate standard fluid system piping while providing simple reliable and known control components to personnel in the field. Further, the multiple input/output connections and the adjustable programming and connections permit adaptation of the basic unit to widely different mixed air system configurations and/or operations. Thus, the controller establishes and incorporates all basic functions, operations and options in a single integrated unit for practically any standard or custom-designed mixed air system.

The well known components can be readily factory mounted and operated thereby minimizing material installation cost as well as field assembly cost and labor. The present invention particularly provides a mixed air cooling equipment having automatic sequencing control with the outdoor air below a selected temperature level and further provides minimum adjustment outside air supply with the outside air above the selected level, while still permitting modulation of the mechanical refrigeration apparatus. Outside cooling air is employed when a transient condition demands mechanical refrigeration as a result of external lock-out. The minimum percent adjustment may be disabled under winter mode conditions in order to prevent freezing of the mechanical equipment and the like. The system automatically shuts down the mechanical equipment and closes the dampers in the event the forced air system fails, once again to prevent coil freezing.

As noted above, the controller may provide an auxiliary binary output for associated or special options.

Thus, in accordance with another aspect of the present invention a separate humidity logic unit can be provided where humidity control as well cooling and heating control is desired. The humidity logic network is directly coupled to the output of the basic control by responding to the mechanical heating control or the conditioning control signals as well as the auxiliary outputs permitted by the unique conditioning control units.

The present invention provides a single integrated and compact controller creating a selectively established series of logic functions directly related to air-related input/outputs and set points within a mixed air conditioning system, as well as providing the necessary safety interlocks to protect critical components within the air handling and conditioning system under any normal and abnormal conditions.

BRIEF DESCRIPTION OF DRAWINGS

The drawings furnished herewith illustrates a preferred construction of the present invention in which the above advantages and features are clearly disclosed as well as others which will be readily understood from the following description.

In the drawing.

DESCRIPTION OF ILLUSTRATED EMBODIMENTS

Figure 1:
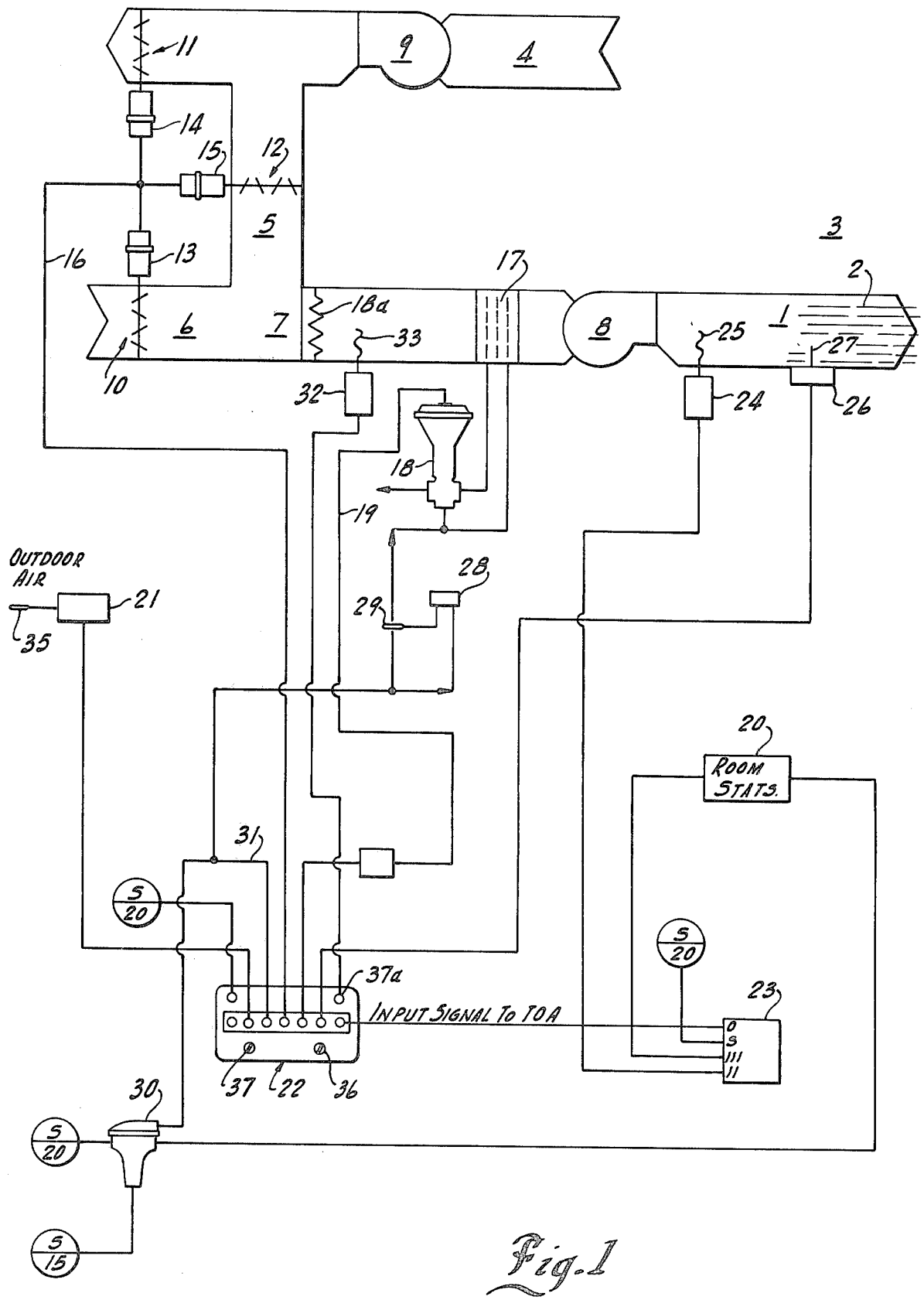
FIG. 1 is a diagrammatic view of a mixed air economizer system incorporating one embodiment of a controller constructed in accordance with the teaching of the present invention.

Referring to the drawings and particularly to FIG. 1, a typical air system for conditioning and ventilating a room or building is illustrated including a main air supply duct 1 for supplying air 2 to the room 3 and an exhaust duct 4 for exhausting air from the room to the exterior atmosphere. A recirculating or return air duct 5 interconnects the exhaust duct to supply duct for selective mixing of exhaust air with fresh air. An outdoor air supply duct 6 is provided for introducing fresh outside air into a mixing area or box 7 for mixing with return air from duct 5 which is connected to the supply duct 1. Fans 8 and 9 in the respective supply and exhaust ducts 1 and 4 create forced air flow through the system. The fans 8 and 9 operate continuously to maintain a continuous circulation of air through the room. In accordance with conventional practice, individual dampers 10, 11 and 12 are provided for controlling of the air flow through the respective ducts 4, 5 and 6. The outside air supply damper 10 is normally closed and selectively opened for controlling the supply of fresh outside air introduced into the system. Exhaust damper 11 is also normally closed and selectively opened to control exhausting air volume from the system. Return air damper 12 is normally open to establish a recirculation path for the air. Each of the dampers 10–12 are generally similarly constructed and includes an individual pneumatic actuator 13, 14 and 15 for proportional positioning of the corresponding damper. The actuators 13–15 of dampers 10–12 are connected to a common control signal line 16 and simultaneously and proportionally operated from the normal position. Thus, the return damper 12 is reversely positioned from that of the outdoor air supply damper 10 and the exhaust damper 11 to maintain an appropriately balanced air system.

A mechanical cooling unit, shown as water cooled coil 17, is shown mounted in the supply duct 1 immediately downstream of the air mixing box 7 for controlling the temperature of the air supplied to the room. A filter 18a is shown to the input side of the coil unit 17. The cooling coil 17 is connected by a conventional valve 18 to a chilled water supply for appropriate conditioning of the filtered air. Valve 18 is pneumatically actuated and includes a signal line 19 for selectively opening the valve.

The dampers 10–12 and the cooling valve 18 are controlled in accordance with the sensed condition of room air as well as the relative condition of the outdoor air in relationship to the recirculated or exhaust air. Thus in the illustrated embodiment of the invention, a room thermostat 20 and an outdoor thermostat 21 provides respective input signals for controlling the source of cooling of the room air.

The several control dampers 10–12 and valve 18 are controlled through the use of an integrated controller 22 adapted to receive the various input signals generated from thermostats 20 and 21 and establishing the appropriate output signals for the various control components.

In the illustrated embodiment of the invention, the controller 22 is connected to create a single path, mixed air and chilled water conditioning system for the room air, with an automatic switchover of cooling between outside air and the cooling coil. More particularly, the demand signal is obtained from a pneumatic thermostat 20 mounted to sense the room air and producing a corresponding pneumatic demand signal. The temperature signal is coupling through a 2-element receiver-controller unit 23 which provides an output to the logic controller 22. The controller unit 23 has a second input connected to a discharge thermostat 24 having a sensing element 25 mounted in the air supply duct 1 immediately downstream of fan 8 to insure a minimum temperature condition. These signals control the generation of the output signal from the logic controller 22 indicating a demand for conditioning of room air. The logic controller 22 generates output signals at the damper and coil input lines 16 and 19 which are repetition of the signal from controller unit 23. This establishes proportional operation of damper actuators 13–15 through the common connection and of the cooling control valve 18. This further creates a proportional operation of the outside air damper 10, return air damper 12 and exhaust air dampers 11 as well as the cooling coil 17. An airflow sensing switch 26 is also provided having a flow sensor 27 in the supply duct 1 downstream of the supply fan 8. The switch 26 is connected to provide a control signal to the controller 22 which generates an output signal to dampers 10–12 and coil 17 only if there is air flow through duct 1. Thus, if fan 8 stops, the actuators 13–15 and the cooling valve 18 return to a normal standby position.

In the illustrated embodiment of the invention, a switching thermostat 28 is also provided having a sensing element 29 in the chilled water line to the cooling coil 17. Thermostat 28 provides a pneumatic signal to an air switching valve 30 which is operable to change the air supplied to the room thermostat. The thermostat 28 also is connected to an auxiliary output line 31 of the controller 22 which is connected to actuate the valve 30. The thermostat 28 will prevent the switching unless chilled water is available.

A limit thermostat 32 has a sensor 33 upstream of coil 17. If air temperature drops beyond a desired lower limit, the controller 22 responds to actuate the dampers and particularly the outside air dampers to modulate and return them toward the closed position in accordance with the increasing undesired decreasing temperature. As the sensed temperature increases below the set point value, the limit control is removed and is returned to the room temperature controller 20.

The outside air sensing thermostat 21 has a sensing element 35 located in the outside air. Thermostat 21 provides an input to the controller 22 which operates to create automatic switch-over in the operation of the damper system, dependent upon the relative condition of the outside air. As long as the outside air temperature is below the switchover setting, the several dampers are modulated in accordance with the signal from the room controller unit 20. When the outside air temperature rises above the switchover temperature, the controller 22 automatically establishes a condition setting the outside air dampers to the minimum adjusted ventilating position. A minimum outside air is supplied and a maximum amount of return air is recirculated. An adjustment means such as a set-screw input means 36 permits field setting. This setting is also factory calibrated. A low limit control input 37a is also provided to override the minimum adjustment setting of means 36 to maintain optimum system operation.

The adjustments are factory calibrated and set, with field setting in accordance with the system requirement. The dampers and the cooling coil are thus operated in appropriate sequence and in a proporational manner. The various thermostats and sensing elements, control valves, dampers and associated operators may be of any conventional or desired construction which provides for open pneumatic signals. Such system pressures and components are standard and well known and no further description is given herein other than where necessary to the full and clear description of the embodiment of the invention.

Figure 2:
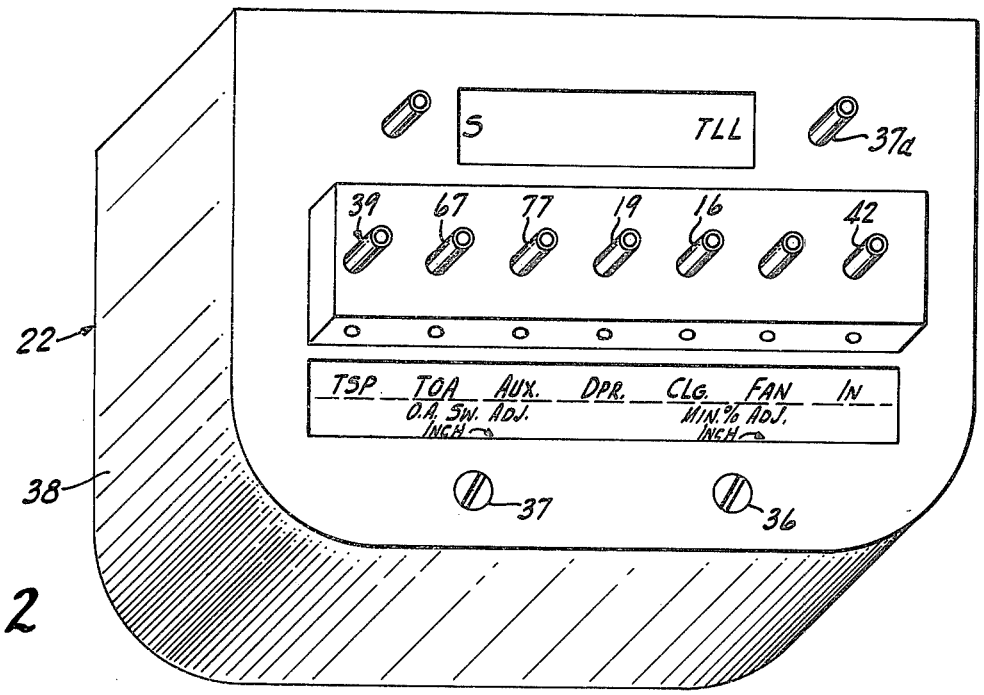
FIG. 2 is a pictorial view of a controller unit as shown in FIG. 1.

The controller 22 is preferably formed in a single package and housing such as shown in FIG. 2. Generally, controller 22 includes an outer support structure or housing 38 having a plurality of interconnecting pneumatic input/output jacks 39, for each of the described inputs and outputs as well as appropriate set point adjustments screws for setting of the minimum percent adjustment of the outside air dampers and the outside air temperature switchover point. The several connections are provided with appropriate identifying labels.

The several logic elements for comparing of the input signals, the system status and the like for generating of the necessary output signals are adapted to be conveniently physically mounted within the housing 38 with appropriate interconnecting tubing.

Figure 3:
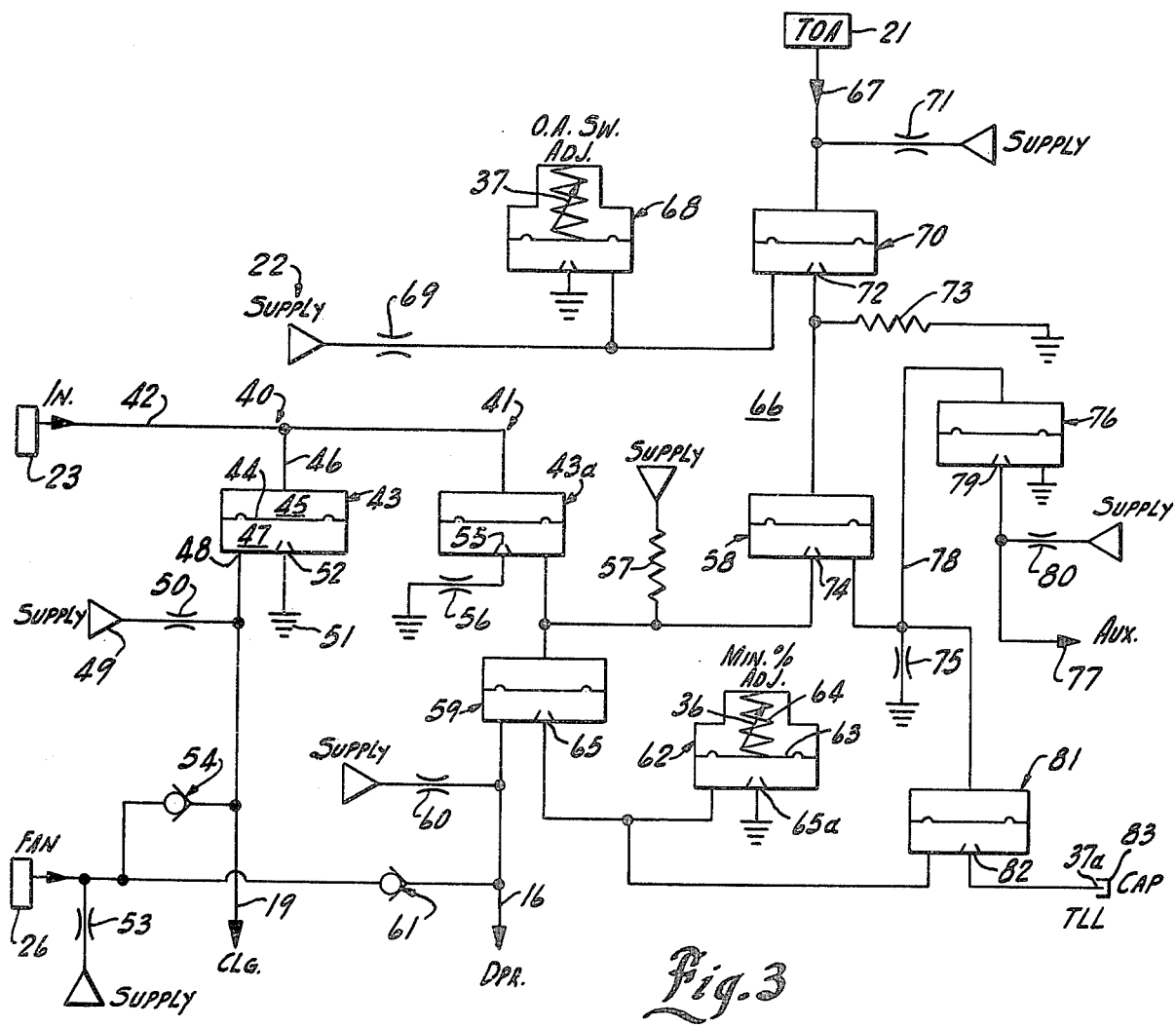
FIG. 3 is a schematic network of the controller shown in FIGS. 1 and 2.

A preferred construction of the logic circuit of controller 22 is more illustrated in FIG. 3. The circuit generally includes a plurality of pneumatic amplifiers, switches and logic devices providing a mechanical cooling control channel 40 and a damper control channel 41 between the common input signal line or connector 42 to the controller 22 from controller unit 23 and the individual outputs 16 and 19. The interlocking controls are applied to these channels to provide the appropriate control.

The input to each of channels 40 and 41 preferably includes a similar fluid repeater 43 and 43a. Fluidic repeaters are well known and readily available devices. Although the suitable device might be employed, a highly satisfactory structure is shown in U.S. Pat. No. 3,662,779. The illustrated devices are generally of diaphragm type construction having convoluted diaphragm 44 secured within a housing and defining a closed input chamber 45 having an input signal connection or port 46. The input chamber 45 is a closed chamber providing an infinite impedance, thereby eliminating loading of the input pressure signal. The opposite or output chamber 47 of the repeater includes an air supply/output port 48 which is connected to a regulated air supply 49 through a restrictor or orifice unit 50. The port 48 is also connected directly to the output line 19. The output chamber 47 is also connected to atmosphere 51 through an exhaust orifice 52. In accordance with known functioning, the position of the diaphragm 44 relative to the orifice 52 generates a variable restrictor which, with the supply orifice 50, develops a pressure divider with the output pressure being related thereto. As the diaphragm moves towards the orifice, the flow is reduced and an increased pressure drop occurs across the exhaust orifice restriction, resulting in an increase in the output pressure. The diaphragm is positioned by the balance between the input signal pressure in the input chamber 45 and the pressure within the output chamber 47. With the diaphragm area in the two chambers equal, the diaphragm 44 thus moves to create an output pressure which balances the input pressure, and produce a one-to-one relationship and the fluid pressure repeating function. The repeated output signal port 48 of the repeater unit 43 is connected via line 19 to the cooling valve.

The mechanical refrigeration unit 17 is thereby controlled by the input signal on a one-to-one ratio. As previously noted, the mechanical cooling or refrigeration equipment should only be operated with the fans 8 and 9 operating. In the illustrated embodiment of the invention, flow switch unit 26 is connected to control a decoupling circuit to the cooling control line 19. An air supply is connected through a dropping orifice 53 and a pneumatic or fluid diode 54 to the output signal line 19. The fan switch unit 26 is connected to the input side of the diode 54. With the fan operating, the switch unit 26 is closed and the diode is bias closed, thereby preventing bypassing of the output signal from the mechanical refrigeration control line 19. If the fan 8 ceases to operate, the air flow terminates or at least drops below the setpoint of switch 26, and the pneumatic air-flow switch 26 opens. The open switch unit 26 directly grounds the dropping orifice 53 and allows the diode 54 to be forwarded biased from line 19 and thereby grounds the output pressure at the cooling control line 19. The diode 54 then conducts and bypasses the pressure signal from the output connection 19 and prevents operation of the cooling valve 18 and cuts off supply of cooling water to the coil 17.

The primary input signal is also connected to the damper actuators channel 41 and particularly repeater 43a, which is essentially of the same construction and functions in the same manner as that of the fluid repeater 43. In the damper control channel, however, various interacting controls are combined with the primary input. In particular, a switch-over control and a minimum damper position control are interconnected into the logic system to selectively provide overriding control interrelated functions and operations, as follows.

As shown in FIG. 3, the damper fluidic repeater 43a has its input chamber connected to the primary input signal line 42 from receiver-controller 23. The exhaust orifice 55 is connected to ground or atmosphere through a small dropping orifice 56. The input/output port is connected to supply air through a resistor 57 and to an outside air controlled switch unit 58 which provides an automatic interlock means related to outside air temperature, as subsequently described.

The input/output port is also connected to the input chamber of a coupling fluidic repeater 59 similar in structure to repeaters 43 and 43a. The output chamber of repeater 59 has a common supply/output port connected to the regulated air supply through a dropping orifice 60 and directly to the damper control line 16 for providing of the signal to the several pneumatic damper actuators 13-14, as shown in FIG. 1.

The output line 16 is also connected through a pneumatic diode 61 to the fan signal switch 26 such that an output signal to the damper actuators can only be generated with the fan 8 operating.

In addition the coupling pneumatic repeater 59 has its exhaust orifice interconnected to a minimum adjustment control valve 62 which is controlled as follows.

The minimum percentage adjustment valve is shown as a diaphragm unit having a closed input chamber and an output chamber on opposite sides of a diaphragm 63. The diaphragm is spring loaded by a coil spring 64 which is selectively compressed by the adjustment screw 36 for biasing of the diaphragm to a minimum position. The output chamber has an output port connected to the orifice 65 of the damper fluidic repeater 59 and its own exhaust orifice 65a connected to atmosphere. The spring setting establishes a force to close the exhaust orifice. This tends to close the exhaust orifice of the fluidic repeater and result in a minimum restriction or drop in the exhaust of the supply signal at line 19. Thus, even though repeater 59 is fully open, which would tend to fully exhaust the supply signal at line 19 and thus cause the outside dampers to close, the series connection inserts the drop across the valve 62. This creates the minimum output damper signal at line 19 which will operate the actuators 13-15 and hold the outside air damper 10 at a minimum open position to insure a minimum supply of fresh air in the system.

As noted previously, the signal to the damper line 19 and therefore actuator 13-15 directly corresponds to the primary input signal as long as the outside air temperature is below the setting of the outside air switch-over control as set by adjustment means. When the outside air temperature rises above such setting, the system automatically switches over and closes the outside air dampers to the minimum position as established by the minimum percentage adjustment control valve 62 in the following manner.

In the illustrated embodiment, the outside air control means includes a pneumatic branch or channel 66 having an input signal connector 67 connected to thermostat 21. The channel 66 includes a diaphragm actuated valve 68 of the same construction as that of the minimum percentage adjustment air valve 62, with the common input/output port connected to the supply through a dropping restrictor 69 and to a high pressure selector switch unit 70. The pressure selector unit 70 is also constructed as a diaphragm unit similar to the construction of the fluid repeaters. Its input chamber is connected to the output air thermostat 21 and in addition to supply air through a pressure dropping orifice 71. The high pressure selector unit 70 also includes an orifice 72 which is connected to ground through a relatively large dropping resistor 73 which is connected as the output signal to actuate the pneumatic switch 58. The output of the switch 58 is coupled to the signal control channel 41 and connected to control the signal flow through the damper control channel 41, as more fully described hereinafter.

The adjustable setpoint switch unit 68 establishes a setpoint switching pressure which is supplied to the output chamber of the high pressure selector valve 70. Thermostat 21 acts to normally ground or bypass the supply pressure from unit 70. As the temperature rises, the thermostat closes and an increasing pressure signal is supplied to the selector valve 70. The high pressure selector valve 70 operates to transmit the higher of the setpoint pressure or the outside air signal pressure as a result of the relative input pressure set by the outside thermostat 21 and the signal supplied from the setpoint switch unit 68. With the setpoint signal applied to the output chamber higher than the input signal from the thermostat 21, the supply air passes through the valve output chamber to ground via resistor 73 and develops an output pressure equal to the setpoint pressure signal of valve 68. At a selected outside air temperature, the thermostat unit 21 closes and creates a higher pressure at the input chamber to the selector unit 70 than the setpoint pressure. The selector unit 70 effectively closes and reduces the output signal transmitted to the input chamber of the switch unit 58.

The pneumatic switch unit 58 is basically of the construction of the fluid repeater, with its orifice 74 opened or closed by the diaphragm. The orifice is connected to the supply resistor 57 in common with the damper channel repeaters 43a and 59. The switch 58 is normally open and is held closed by the signal from the selector unit 70. When the output signal from selector unit 70 drops, switch 58 opens. The output chamber of the pneumatic switch 58 is connected via its orifice 74 to the damper signal channel and also ground through a small dropping orifice 75. When switch 58 opens, the supply connection to the channel 41 is diverted to ground and the signal pressure to output repeater 59 is held low, with a corresponding low signal to the damper actuators 13-15 via line 16.

As long as the outside air temperature is a minimum selected level below the outside air, the return air and exhaust air dampers modulate with the demand signal. However, when the outside air temperature rises and is above the setting of the adjustable pressure regulator valve 68, switchover occurs and the outside air dampers close to the minimum position as established by the minimum percentage adjustment valve 62.

The output of the pneumatic switch 58 is also connected as the input to an auxiliary signal repeater 76, the output of which is connected to produce an auxiliary binary signal at the auxiliary connector 77. Thus, repeater 76 is constructed in the same manner as the previous repeaters, with the dead end input chamber connected to the output chamber of switch 58 via line 78. The output chamber port is connected to atmosphere and the exhaust orifice 79 is connected to air supply through a dropping orifice 80 and to the auxiliary output connector 77. When the pneumatic switch 58 is closed, the output chamber bleeds to zero and the repeater 76 opens to also bleed the supply to atmosphere. The auxiliary signal therefore drops to zero or at least a very low level such as equal to or less than 1 PSIG in a practical application. When the pneumatic switch 58 opens, the signals reverse in state with repeater 70 closing and thereby developing a high pressure such as 19 PSI in a normal 20 PSI system signal at the auxiliary output. The auxiliary signal is therefore effectively zero or 19 PSI signal in direct correspondence to whether the outdoor air temperature is above or below the setpoint. This auxiliary signal can be employed in various auxiliary control, such as an interrelated humidity control shown in FIG. 4 and hereinafter described, or it may be capped.

In addition, the pneumatic switch 58 has its output connected to a temperature limit control system which includes a signal repeater or switch 81 having its deadend input chamber connected to switch 58. The output chamber of the pneumatic switch 81 has its port connected in common to the output chamber of the minimum percentage adjustment regulator valve 62 and to the orifice 65 of the damper output repeater 59 of the damper channel 41. The exhaust orifice 82 of the switch 81 is connected via a line to a temperature low limit output connector 37a which may be set in a plurality of different control position. With the connector open, the orifice is connected to atmosphere. With the pneumatic switch 81 open, the damper signal is bled or exhausted to atmosphere as long as the outdoor air temperature is below the switchover setpoint. The switch 81 therefore bypasses the valve 62 for the outdoor air dampers. This condition may be used, for example, in a winter mode of operation where the damper signal is to continuously match the primary input signal on a one to one ratio. The minimum setting would be considered undesireable because the cold air could be such as to cause freezing of the coil unit 17.

If the output tap or connector 37a is capped as by a cap 83, it effectively removes the pneumatic switch 81 from the circuit and operatively connects the minimum adjustment regulator valve 62 into the circuit. The damper signal now matches the primary input signal at repeater 43a to the minimum PSI signal, as set by the minimum percent adjustment regulator valve 62. The damper signal is held at that minimum value even though the primary input signal continues to drop to signal the dampers should continue to close. This is desireable, of course, to maintain minimum ventilation.

Finally, an overriding control signal can be introduced into the system at the connector 37a, as shown for example, in FIGS. 1 and 2. The mixed air low limit thermostat 32 provides a controlled opening and closing of the connector 37a and therefore the orifice 82 of the switch 81. Under normal operation, if the outside air temperature signal is above the selected level, the switch 81 is closed and the minimum percent outdoor air damper positioning is controlled by the minimum adjustment valve 62. If the tmperature drops, switch 81 opens and inserts thermostat 32 into the system. The low limit thermostat provides a selective by-pass of the minimum adjustment and will operatively lower the damper signal below the minimum setting as the temperature changes to be sure low limit protection as required or desired is achieved. It is highly desireable to limit the minimum percent adjustment during the winter modes in order to positively prevent the possibility of coil freeze-up by improper adjustment of the minimum percentage. The low limit controller provides a means for selectively and effectively controlling the minimum percent adjustment.

Thus, in summary, the illustrated embodiment discloses a cooling system in which the several pneumatic input/output signals are coupled through a single integrated control unit for the dampers, the mechanical cooling system and the interrelated components with the desired interlock. Thus, the basic control unit provides a sequencing control signal to the primary input to control the outdoor air dampers and the mechanical refrigeration in proper sequence, to use the maximum available natural cooling, without adverse effect on the system components with automatic use of mechanical equipment when the natural cooling is insufficient. The system has means to compensate for the temperature of the outdoor air, the desired minimum ventilation, appropriate safety interlock of the controls, as well as permitting auxiliary component interconnection and control.

Although shown in a particular single path mixed air system, the controller 22 is directly adapted to the various other single and multiple zone air systems employing air damper controls and mechanical conditioning controls, through the connection of various controllers, transmitters, sensors and such field hardware units. As these devices are well known to those in the art, no further discussion or description of temperature controlling system is therefore given.

The temperature controller 22 of FIG. 3 is also adapted for example, to be coupled to drive an interrelated humidity control unit in a preferred sequence with the mechanical cooling system. Preferred and unique embodiments of a humidity controller coupled to a temperature controller such as shown in FIGS. 1-3 are shown in FIGS. 4 and 5.

Figure 4:
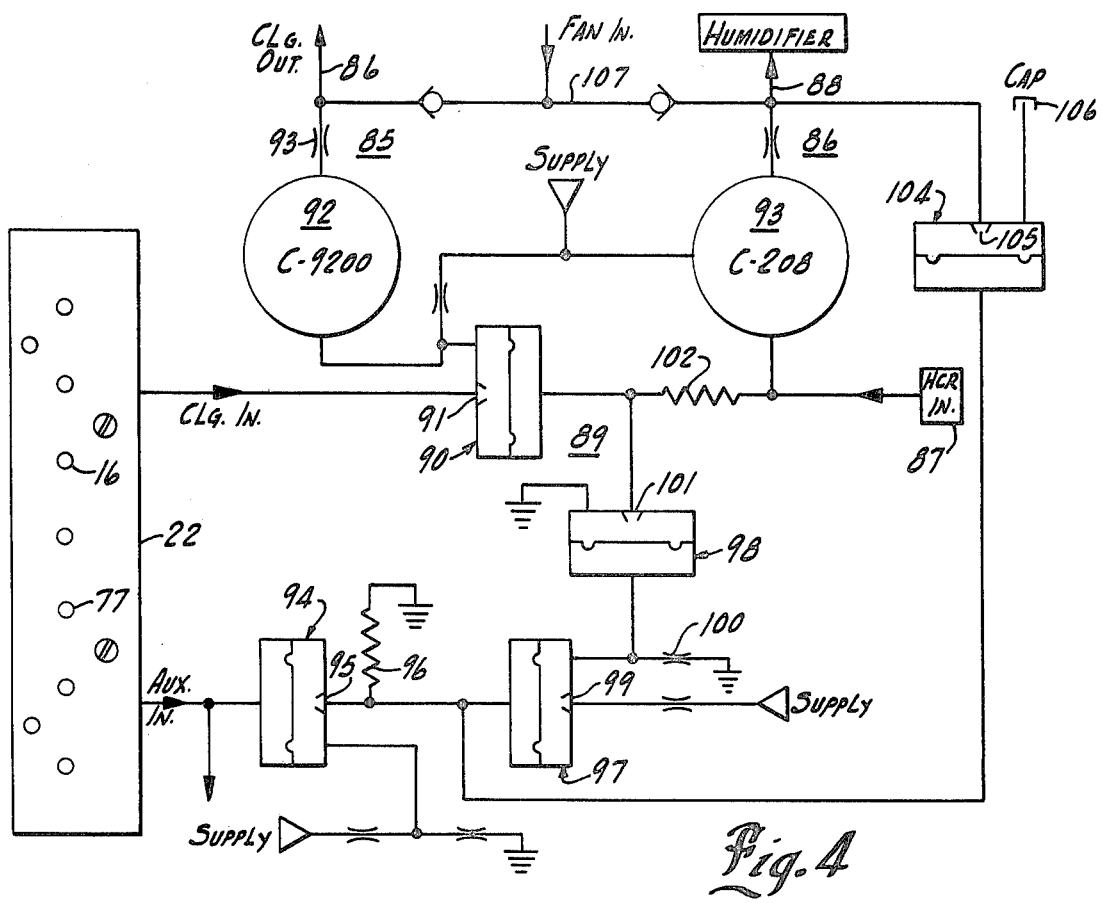
FIG. 4 is a schematic view of a humidity control unit and illustrating an extension of the basic temperature control unit to control the interposed humidity control unit.
Figure 5:
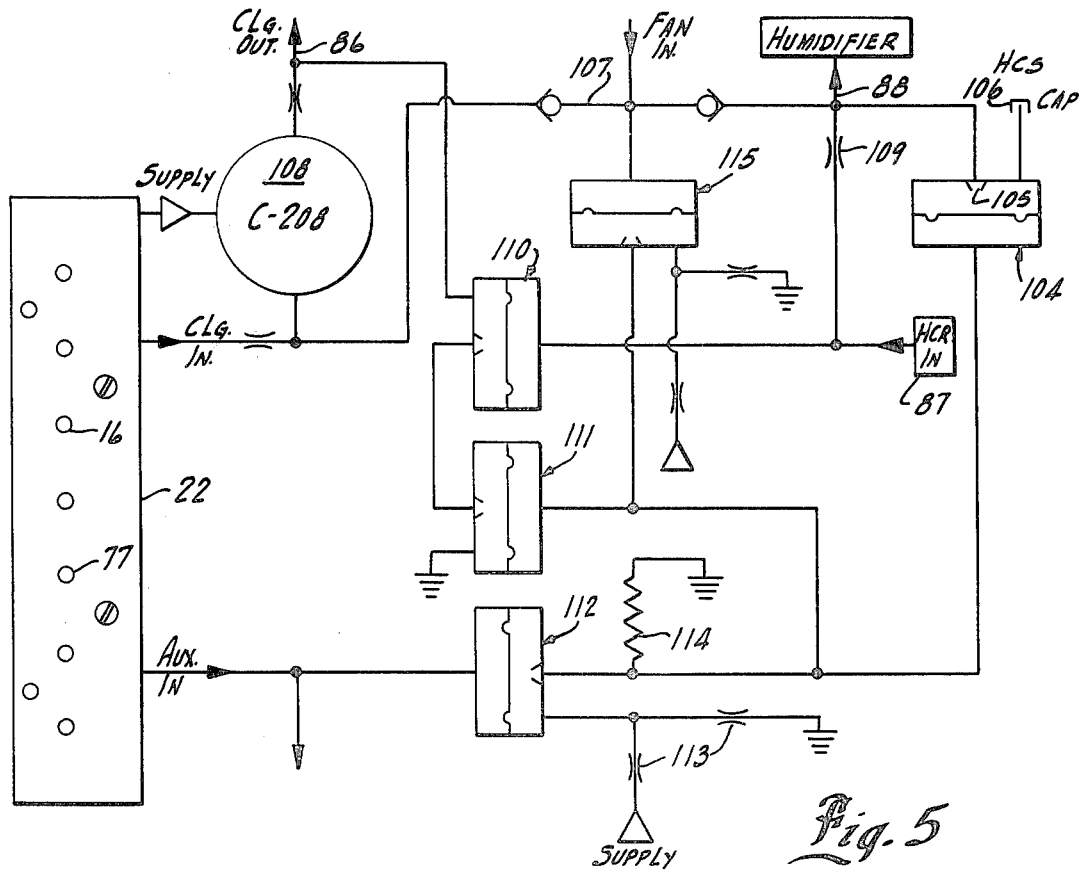
FIG. 5 is a view similar to FIG. 4 illustrating an alternate humidity control unit coupled to basic temperature control unit.

The embodiment of FIG. 4 provides a logic control with a normally closed cooling override while the embodiment of FIG. 5 provides a similar humidity control with normally open cooling override. Both systems establish proper monitoring and sequencing to provide the addition of the humidity during the winter mode of operation and dehumidification during summer mode of operation. Further, each humidity network may be conveniently factory assembled in a compact, integrated unit such as shown in FIG. 2 for the temperature network.

Referring particularly to FIG. 4, the normal closed loop override system includes a cooling output channel 85 and a humidity output channel 86. The cooling output channel 85 is coupled directly to the cooling signal connector 16 from the conditioning unit 22 and a cooling output line 86 is connected to the mechanical refrigeration such as the valve of FIG. 1. A humidistat 87 provides an input signal to the humidity channel 86 and generates an output humidity signal at an output humidity control line 88 for selectively providing addition of humidity as needed. During a summer mode dehumidification is established by operation of the cooling means in response to the humidity related signal. An interlocking and interrelating pneumatic circuit 89 interconnects the humidity control signal into the cooling control through a pressure selector unit 90. In addition, circuit 89 includes a sequence switching network connected to the auxiliary status signal at the auxiliary connector 77 of the temperature conditioning unit 22 and to unit 90. More particularly, the cooling signal from the conditioning unit 22 is coupled to the high pressure selector unit 90 for selective transmission of the cooling signal to the cooling output signal only. The selector switch is a diaphragm unit similar to the high pressure selector 70 of the temperature control network shown in FIG. 3. The cooling input signal is supplied to the orifice 91 of the selector unit 90, with the output port connected in series with a cumulator 92 and a dropping orifice 93 to the cooling output line 86. With the unit 90 open, the cooling output repeats the cooling input signal less the constant pressure drop which may be typically on the order of 5 PSI to provide a corresponding control signal to the mechanical cooling unit 17–18. The humidity control signal is coupled directly to its output 88 through a reverse acting cumulator 93. The output signal is effectively the inverse of the input signal to provide appropriate humidity control.

The pneumatic interlocking network 89 provides for selective changing of the status of the cooling signals and the humidity signals in accordance with the outdoor air temperature by connecting of the switching circuit to the auxiliary output connector 77 of the control network 22 shown in FIGS. 1–3, as follows. The auxiliary signal connector 77 is coupled to the input chamber of a diaphragm type pneumatic switch 94. Supply is connected to the input/output chamber of the switch 94 and exhausted through the orifice 95 and a fluid resistor 96 to ground. When the auxiliary input is low, for example equal to or less than 1 PSI, the pneumatic switch 94 is open. Conversely, a high level auxiliary signal, closes switch 94. The output is coupled through a signal repeater 97 of the diaphragm-type to actuate a pneumatic switch 98 connected to the circuit between the humidity signal source and the selector 90. The pneumatic switch 98 is connected to selectively couple and decouple the dehumidity signal from the high pressure selector 90. The fluidic repeater is similar to those previously described and has an input chamber connected to the output line of switch 94. Orifice 99 of repeater 97 is connected to supply and the output is connected to through an orifice 100 to ground and directly to the input chamber of the pneumatic switch 98. Thus, the orifice 101 of switch 98 is connected directly to the input chamber of the high pressure selector 90 and through a common resistor 102 to the humidity input signal. The humidity signal is thus operatively connected to the input chamber of the high pressure selector 90 only with the switch 98 closed. With the switch 98 open, the humidity signal is bypassed from selector 90 to ground.

In the presence of a low input auxiliary signal, switch 94 is open and switch 97 is then closed, producing a low input signal to the switch 98 which opens. This effectively bypasses the humidity signal from the high pressure selector signal 90 and allows the separate operation of the cooling system and the humidity system, as previously described. When the auxiliary signal switches to its high level, such as 19 PSIG in a typical example, as a result of the sensing of the switchover in the temperature unit 22, switch 94 closes and repeater 97 opens to transmit a high input pressure signal to the switch 98 which closes. The humidity control signal is now simultaneously applied to the reversing channel and to the high pressure selector 90. The high pressure selector 90 acts to compare the input pressure level of the cooling signal received from the unit 22 and the humidity control signal from humistat 87 and provides a proportional output signal, equal to the highest input minus the fixed pressure drop, to the output control line 86. The cooling signal is thus directly related and proportional to either the cooling input signal or the humidity input signal.

The humidity control signal is simultaneously applied to the humidity output line 88. However, in the illustrated embodiment of the invention, the temperature switchover control is also selectively interconnected to the humidity output line through a pneumatic switch 104 to selectively disable this output. Thus the output of the pneumatic switch 94 is also connected to the input chamber of the pneumatic switch 104. The orifice 105 of switch 104 is connected to the humidity signal line 88 and the output port is connected to atmosphere or capped. With the port capped as at 106, the pneumatic switch 104 is effectively removed from the system and the humidity output signal at line 88 is the opposite of the humidity input signal from humistat 87 to provide a corresponding control of the humidity device.

With the cap 106 removed, the switch 104 functions to exhaust from humidity signal line 88 and the humidity output signal automatically drops and is held low, such as to 2 PSIG or less. The humidity source is effectively cut out and only the cooling system is operative.

The system thus permits on automatic sequencing of the mechanical cooling and a humidifier. In particular, the control network establishes a relatively low percentage relatively humidity set point during the winter mode of operation whereby only the addition of humidity is provided when needed. However, during a summer mode of operation, a high percentage relative humidity setpoint may be provided with dehumidification when required by operation of the mechanical refrigeration unit. The humidity control switch 98 maintains constant humidity control regardless of the mode of operation, with both appropriate humidification and dehumidification in proper sequence.

A fan-related interlock branch 107 is coupled to line 86 and 88 such that the total output system is again deactivated if air flow ceases. A further extension of the auxiliary input connector can be provided to produce a further auxiliary output from the humidity control unit. This output might, for example, be connected directly to a third input of a humidity controller to change the percentage relative humidity setpoint as established by a manually established setpoint and ratio adjustments.

A similar humidity control network with a normally open cooling override is shown in FIG. 5.

Thus, referring particularly to FIG. 5, the cooling signal is connected through a reversing cumulator 108 to the output signal cooling line 16 from the temperature unit 22. The humidity control signal is connected to the output signal line 88 through an appropriate orifice 109. The humidity control network of FIG. 5 is provided with a humidity interlock switch system 110 to again selectively couple the humidity signal to the cooling system and to a humidity control output desireable switch 104 to provide for automatic sequencing in response to the change in the auxiliary signal level from temperature control unit 22.

In FIG. 5 the cooling output signal line is selectively bypassed from line 86 through a low pressure signal selector and a series connected pneumatic switch 111. The switch 110 as its chamber connected directly to the cooling signal line 86 and its orifice connected to the orifice of the switch 111. The output chamber of switch 111 is also connected to reference atmosphere. Thus with selector 110 and switch 111 open, the output line is held at low pressure. With the switch 111 closed, the bypass branch is closed and the cooling signal is direct inverse of the cooling input signal.

The pressure selector 110 is coupled directly to the humidity signal line. With the switch 111 open, the selector 110 is set to balance the output cooling signal with the humidity control signal and the cooling output is the lowest of the cooling signal and the humidity signal.

The switch 111 is controlled by the auxiliary input signal through a pneumatic switch 112, which has its input chamber connected to the auxiliary input signal line. The output chamber port is connected to supply through voltage dividing series connected orifices 113 and the orifice is connected to the input chamber of switch 111 as well as to atmosphere through a high valued resistor 114. Thus, the output of the switch 112 is an inverse of the auxiliary signal.

When the auxiliary input signal is low, switch 112 is open and establishes a relatively high level pressure signal to the seitch 111. The switch 111 closes and operatively disconnects the bypass branch including the selector unit 110 from the cooling signal line 86.

The output of the auxiliary signal switch 112 is also coupled to the humidity signal bypass switch 104 as in FIG. 4. Switch 104 is thus closed simultaneously with the closing of switch 111, and the system oeprates with the individual and separate cooling and humidity output signals.

With the auxiliary signal from unit 22 high, the signal pressure to input chambers of the switch 111 and to switch 104 decreases or drops to atmospheric or ground, through the resistor 114. Switch 104 opens and with the switch uncapped, the humidity signal line 88 is held low and only the mechanical cooling system is operated. Switch 111 opens and the bypass system is connected to hold the cooling signal line 86 at a low level or at the level of humidity signal. The cooling signal line 86 is therefore the lesser of the cooling signal input at connector 16 or fo the humidity signal input from the humistat 87. The system thus operates with the humidity source disabled and the mechanical cooling under the control of both the cooling signal and the humidity signal. The condition remains as long as the auxiliary signal is high.

In addition the fan signal branch 107 is shown coupled through a pneumatic switch 115 to provide an additional control to the pneumatic switch 111. With the fan operating, a relatively high level pressure signal is applied to the pneumatic switch 115 which closes thereby effectively removing its signal from the system. If the fans should stop for any reason, however, the output signal rapidly drops to a minimal level, and switch 115 opens. A high level signal is then connected directly to switch 111 which closes and effectively prevents bypass at the signal at output line 86 which rises to close the normally open cooling valve.

Conversely, with the auxiliary signal low, the system operates with the mechanical refrigeration apparatus responding to the cooling signal and the humidification apparatus responding to the humidity signal.

The present invention thus provides a simple, low cost logic controller unit which may be factory assembled with all necessary field connection readily and conveniently provided. The embodiments employing diaphragm controlled-orifice structure for each of the logic units provides a particularly inexpensive and commercially practical pneumatic or fluid system. A diaphragm-controlled-orifice unit or structure is defined as a unit having the diaphragm which forms part of the input chamber and the output chambers and in which the output chamber includes a port and the controlled orifice for connection into the network.

The present invention particularly provides a basic pneumatic control unit for mixed air conditioning systems which must be interconnected to control systems of various configurations for heating and/or cooling air for rooms and other enclosures.

Various modes in carrying out the invention are contemplated as being within the scope of the following claims, particularly pointing out and distinctly claiming the subject matter which is regarded as the invention.

We claim:

1. A mixed air conditioning fluid control apparatus for an enclosed structure and for a mechanical air conditioning means and an outside air supply and exhaust control means, comprising a conditioning means control channel having a signal input means, an outside air supply and exhaust control channel having a signal input means, demand signal means connected to each of said first and second input means, said conditioning means control channel including an output means adapted to be connected to said conditioning means and developing an output signal related to said demand signal for controlling said conditioning means, said outside air supply and exhaust control channel including output means adapted to be connected to the control means and developing an output signal related to said demand signal for controlling said supply and exhaust control means and having a condition responsive interlock means and a minimum outdoor air setpoint means, said interlock means including a sensor input means and an adjustable setpoint means for generating a control signal at a selected condition and connected in said air supply and exhaust control channel to selectively hold said channel in the standby position, said minimum outdoor air supply means including an adjustable control means connected to said air supply and exhaust control channel to maintain a minimum level air signal independent of said demand signal.

2. The control apparatus of claim 1 including a presettable switch means coupled to said interlock means and to said minimum outdoor air supply means for selectively disabling said minimum outdoor air supply means.

3. The apparatus of claim 2 wherein said presettable switch means includes a second signal input means to control the minimum outdoor air supply means in accordance with the level of said signal.

4. The control apparatus of claim 1 wherein said sensor input means is an outdoor air temperature responsive means.

5. The apparatus of claim 4 wherein an auxiliary output means is connected to said interlock means to establish a signal corresponding to the sensor input means, a humidity logic control means having a third channel having a third input means connected to the output of the first channel and an output means adapted to be connected to the conditioning means and a fourth channel having a fourth input means adapted to be connected to a humidity demand signal source and an output means adapted to control a humidification means, a second interlock means operable to connect the fourth input means to control the output of the third channel conjointly with said first channel output, and means connected to said auxiliary output means to selectively actuate said second interlock means.

6. The apparatus of claim 1 wherein said input means of each of said channels includes a fluid repeater, said second channel including a second fluid repeater connected to the first fluid repeater and to said exhaust control means, said interlock means including a fluid pressure selector connected to said sensor input means and to said adjustable setpoint means and generating said control signal at said selected sensed temperature condition, said interlock means includes a fluid switch connected to the connection of said first and second repeaters and operable to selectively by-pass the output of the first repeater from said second repeater.

7. The apparatus of claim 6 wherein each of said repeaters, said selector and said switch is a diaphragm-controlled orifice unit having an output chamber including a port and an orifice for controlling flow therethrough.

8. The apparatus of claim 6 including a fan status means having an input means adapted to be connected to a flow sensing switch means and having by-pass means actuated by said input means and coupled to said first repeater of said first channel and said second repeater of said second channel and operably removing the output signal in response to selected fan failure.

9. The apparatus of claim 6 wherein said adjustable control means includes an adjustable leak-port unit connected to said second fluid repeater to maintain minimum output from said fluid repeater and having a presettable leak-port switch means coupled to by-pass said adjustable leak-port unit in response to operation of the interlock means.

10. The apparatus of claim 9 wherein said leakport pressure switch includes a control orifice means, means to connect a pressure signal to said control orifice means and thereby override the setting of minimum load means, and means to selectively open and close said control orifice to control the operative connection of the minimum load means.

11. The apparatus of claim 6 including an auxiliary repeater means connected to said interlock fluid switch to generate a related auxiliary signal, a humidity logic unit having third and fourth control channels, said third channel being connected between said first channel and said conditioning means and having a third input means connected to the output of the first channel and having an output adapted to be connected to said first conditioning means, said fourth channel having a fourth input means adapted to be connected to a humidity signal source and having an output adapted to be connected to actuate a humidification means, a humidity interlock fluid switch means coupling said fourth input means to third channel for conjointly controlling said conditioning means, a by-pass fluid means having an input coupled to said auxiliary output means and an output coupled to said humidity interlock switch to selectively actuate said interlock means, a humidity disable switch and connected to the fourth channel for selectively controlling the output of said fourth channel said disable switch being connected to said auxiliary repeater means.

12. A mixed air conditioning pneumatic control unit having a housing with a plurality pneumatic signal connector means for input/output connectors in an interrelated control system of a mechanical air conditioning means and an outside air supply and exhaust damper means for controlling of the mixed air supplied to an enclosure, comprising a conditioning means control channel having a fluid repeater with a signal pressure input connector means adapted to receive a temperature-related fluid signal, an outside air supply and exhaust control channel having a fluid repeater with a signal pressure input connector means adapted to receive a temperature related fluid signal demand signal means connected to each of said first and second input means, said repeater of said conditioning means control channel including a fluid signal output connector means adapted to be connected to said conditioning means and developing an output signal directly related to said demand signal for controlling said conditioning means, said outside air supply and exhaust control channel including a second fluid repeater connected to a first output of the first fluid repeater of the same channel and to a damper output connector means adapted to be connected to damper means and developing an output signal directly related to said demand signal for controlling said damper means, said exhaust control channel including an outdoor air interlock means and a minimum outdoor air setpoint means, said outdoor interlock means including a pneumatic pressure selector having an outdoor air temperature sensor input connector means and an adjustable setpoint leak-port valve connected to supply a regulated pressure to said selector for generating a fluid switchover signal at a selected temperature and an outdoor interlock fluid switch connected to said pressure selector and to the output of the first fluid repeater of said air supply and exhaust control channel to selectively hold said channel in the standby position, said minimum outdoor air supply means including an adjustable pneumatic leak-port valve connected to said second fluid repeater of said air supply and exhaust control channel to maintain a minimum level signal from said second fluid repeater independent of the level of said demand signal, and a bypass switch having an input coupled to said outdoor interlock fluid switch and an output means connected to said second fluid repeater and to said adjustable pneumatic leak-port valve for selectively by-passing and operatively removing the adjustable pneumatic leak-port valve.

13. The apparatus of claim 12 wherein each of said repeaters, said selector, said valves and said switches includes a diaphragm defining an input chamber to receive an input signal and an output chamber having a diaphragm controlled orifice and a common input/output port interconnected in said apparatus.

14. The apparatus of claim 13 wherein said bypass switch means includes a second signal input connector means connected to said orifice, and means to open and close said second signal input connector means and adapted to connect a pressure signal to said orifice to control the minimum outodoor air supply means in accordance with the level of said signal.

15. The apparatus of claim 14 wherein an auxiliary fluid repeater is connected to said outdoor interlock switch and having an auxiliary output connector means to establish an auxiliary fluid signal.

16. The apparatus of claim 15 having a thermostat air supply valve means for supplying of different levels of air pressure for summer and winter conditioning, said valve means being connected to said auxiliary connector means.

17. The apparatus of claim 15 including a humidity logic control unit having a third channel having a third input connector means connected to the output of first repeater of the first channel and an output connector means adapted to be connected to the conditioning means and a fourth channel having a fourth input connector means adapted to be connected to a humidity demand signal source and an output connector means adapted to control a humidification means, a humidity pressure selector connected to the fourth channel and to the third channel for conjointly establishing an output at the third channel related to one of the input signals and a pneumatic switch connected to said auxiliary output means and to said pressure selector to selectively remove the signal from said fourth channel.

18. The apparatus of claim 17 wherein said third channel includes a direct acting cumulator and said humidity pressure selector is connected to the input of said cumulator, said fourth channel includes a reversing cumulator, said humidity pressure selector is a diaphragm unit having a diaphragm defining an input chamber connected to said fourth input means and an output chamber having a diaphragm-controlled orifice and an output port, said orifice and output port of the humidity pressure selector being connected in series in the third channel to control the signal flow therethrough, a pneumatic diaphragm switch connected to the input chamber of said input chamber and having an input chamber coupled to said auxiliary fluid repeater for selectively transmitting the humidity signal to the selector, and a presettable pneumatic diaphragm switch having an input chamber connected to said auxiliary fluid repeater and an output chamber connected to the output of the reversing cumulator and to reference.

19. The apparatus of claim 17 wherein said third channel includes a reverse acting cumulator and said humidity pressure selector is connected to the output of said cumulator said humidity pressure selector is a diaphragm unit having a diaphragm defining an input chamber connected to said fourth input means and an output chamber having a diaphragm-controlled orifice and an output port, a diaphragm-pneumatic switch, said orifice and output port of the humidity pressure selector connected to the output of the cumulator and the pneumatic diaphragm switch to control the signal level at the output of the cumulator, a second pneumatic diaphragm switch connected to the output chamber of said first switch and having an input chamber coupled to said auxiliary fluid repeater for selectively operatively connecting the first repeater and controlling response to the humidity signal at the selector, and a presettable pneumatic diaphragm switch having an input chamber connected to said auxiliary fluid repeater and an output chamber connected to the output of the fourth channel and to reference, and a status responsive fluid diaphragm repeater having an input chamber adapted to be connected to a static signal source for monitoring the operation of a system component and an output chamber connected to the input chamber of said second pneumatic diaphragm switch.

* * * * *